United States Patent [19]
Cremona

[11] Patent Number: 5,226,243
[45] Date of Patent: Jul. 13, 1993

[54] BELT CONVEYOR PLANT FOR WOOD PANEL DRYING

[75] Inventor: Lorenzo Cremona, Monza, Italy

[73] Assignee: Angelo Cremona & Figlio S.p.A., Milan, Italy

[21] Appl. No.: 885,838

[22] Filed: May 20, 1992

[30] Foreign Application Priority Data

May 22, 1991 [IT] Italy .................... MI91A001408

[51] Int. Cl.⁵ .................................. F26B 13/08
[52] U.S. Cl. ................................. 34/116; 34/121
[58] Field of Search ............. 34/114, 115, 116, 117, 34/122, 118, 113, 121

[56] References Cited

U.S. PATENT DOCUMENTS 4,654,981  4/1987  Greabe et al. .......... 34/116 X
4,862,600  9/1989  Cremona ..................... 34/117

*Primary Examiner*—Henry A. Bennett
*Attorney, Agent, or Firm*—Keck, Mahin & Cate

[57] ABSTRACT

A plant (10) for the drying of wood panels and in particular veneer comprises two conveyor belts (12,13) overlying substantially in contact along a sinuous path between guide rollers (16) inside a drying chamber (11). The wood panels are conveyed between the overlying belts (12,13) from an input end to an output end of the chamber. Outside the path in mutual contact the two belts (12,13) wind on powered running rollers (17-20), the rollers (16) inside the sinuous path in contact being idling rollers. In particular, the powered rollers (17-20) are transmission rollers at one end of the sinuous path in mutual contact with the belts (12,13).

5 Claims, 1 Drawing Sheet

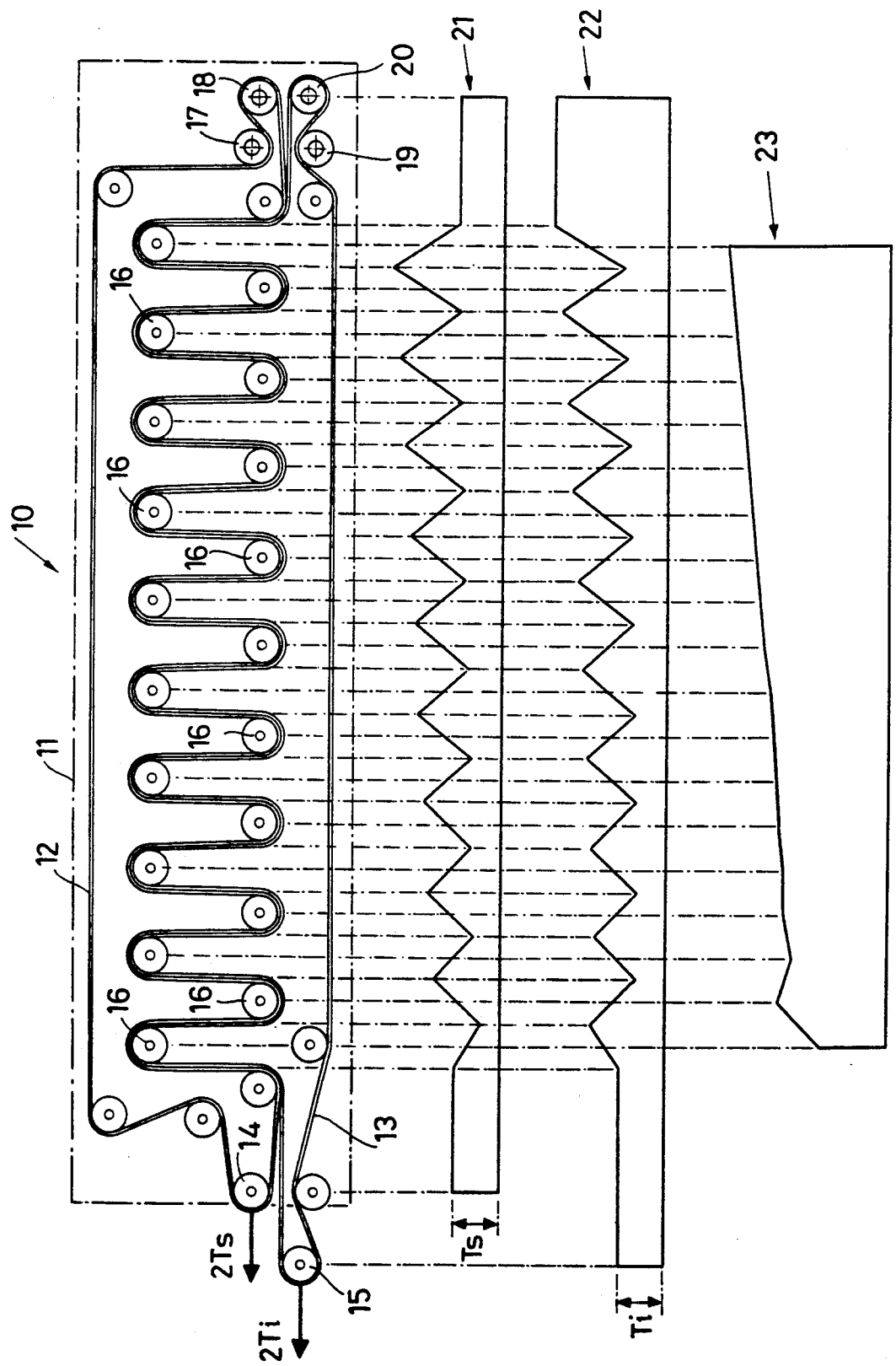

BELT CONVEYOR PLANT FOR WOOD PANEL DRYING

BACKGROUND OF THE INVENTION

In the art of wood drying plants dryers comprising internal conveyors composed of a pair of belts arranged to run overlying with the wood to be dried between them, generally sheets of veneer, are known.

These types of dryers, thanks to the running of the wood sheets between the belts guided along an appropriate path, have the important characteristic of accompanying the drying action by a compression action on the surface of the wood sheets so as to counteract the phenomenon of undulation of said sheets caused by the tensions induced by heating and loss of internal humidity.

In known dryers the belts are moved by powering a part or all of the guide rollers on which the belts are wound along their path with the intention of distributing as much as possible the entraining effort of said belts. Examples of dryers made in this manner are shown, for example, in German patent no. 1,266,233, in U.S. Pat. No. 4,862,600 and European patent application no. 0,152,576, which corresponds to U.S. Pat. No. 4,654,981. Although the entraining effort along the belt is divided, it has been noted that with this type of arrangement the tension on each belt is highly variable along the path with alternation of very taut sections with almost loose sections.

In particular, since the primary factor of resistance is provided by the friction between the belts, they would tend to progressively loosen the tension, but closing them in a loop causes the loosening in a section to be reflected as tightening in another. Thus the driven rollers for entraining behave some as motor elements and some as braking elements, thus counteracting each other and causing in an uncontrollable and random manner zones of strong over-tightening and zones of accented loosening. In the former zones there are produced excessive stresses in the conveyor lines with problems of breakdown and faulty operation while in the latter zones there is a high probability of overlapping of the sheets conveyed with the imaginable treatment defects.

The general purpose of the present invention is to obviate the above shortcomings by proposing a drying plant with overlying conveyor belts with an arrangement of powered traction rollers which prevent excessive and uncontrolled stresses on the belts.

In view of said purpose it has been sought to provide in accordance with the present invention a drying plant for wood panels and in particular veneer of the type comprising two overlying conveyor belts substantially in contact along a sinuous path between guide rollers inside a drying chamber for conveyance between them of the wood panels from an input end to an output end of said chamber and characterized in that outside the path in mutual contact the two belts wind around powered running rollers, the rollers inside the sinuous path in contact being idling rollers.

To further clarify the explanation of the innovative principles of the present invention and its advantages as compared with the known art there are described below with the aid of the annexed drawing a possible embodiment as a nonlimiting example applying said principles.

BRIEF DESCRIPTION OF THE DRAWING

The FIGURE shows a schematic elevational view of a drying plant for wood veneer, together with graphs showing the distribution of tensions in the upper and lower belts along their path of mutual contact and the gradual increase in contact pressure between the belts between the input and output of the drying chamber.

DETAILED DESCRIPTION OF THE PREFERRED EMBODIMENTS

With reference to the drawing there is shown schematically a drying plant indicated generally by reference number 10 made up of a drying chamber 11 (for example, hot air) in which run two belts 12, 13 identifying a sinuous path along the chamber for conveyance of wood veneer to be dried. Along this path the belts are overlapped in contact to exert a predetermined pressure on the sheets conveyed between them. In addition to the support rollers 16 inside the sinuous path, there are at one end (generally on the inlet side of the veneer) two rollers 14, 15 for tensioning of the belts 12, 13 respectively. Said rollers 14, 15 have known tensioning means not shown since they are readily imaginable by those skilled in the art. The drying means present in the chamber 11 are not shown since they can be any known type and therefore well known to those skilled in the art.

Up to this point there is described substantially the known art.

In accordance with the present invention all the support and guide rollers 16 are the idling type and the motive power is applied only to powered transmission rollers 17, 18, 19, 20 placed at one end of the conveyor belts at a point where the belts separate from each other and in particular at the outlet of the conveyed products.

This arrangement is exactly the opposite of the known art in which the powered rollers are always at points where the belts are in mutual contact and to reduce the stresses there is a tendency to power the largest possible number of rollers along the belt path.

Whatever the known art taught, with the arrangement which is the object of the present invention there is apparently an increase in the stresses on the belts and the mechanical parts to which they are connected, since all the motive force is applied at a single point.

In reality, it has been surprisingly found that by eliminating the counteraction phenomena present between the powered rollers at points where the belts are in contact there are no longer situations of uncontrollable local overloading. In this manner the belts and associated structures are much less stressed than with fragmentation of the tension at points on the belts where they are in mutual contact.

In the annexed FIGURE (in which the belt path is only indicative and can have any other known layout) there are shown graphs 21 and 22 of the distribution of tensions of the two belts, upper and lower respectively, along their path in contact. In particular, with tensions imposed on the tensioning rollers 14 or 15, indicated respectively by 2Ts and 2Ti, the belt tensions are initially equal to Ts and Ti and vary along the path only because of friction on the belts, increasing when the corresponding belt is the inside one in relation to a roller and decreasing when it is on the outside. This oscillating behaviour increases progressively in amplitude because of an imposed increase in pressure of contact between the belts between the input and the output of the drying chamber as shown graphically at 23. The behaviour 23 of the pressure is used to compensate for the deformations progressively undergone by the wood as the drying process proceeds.

Thanks to the innovative behaviour of the belt tensions, the stretching effect on the wood is distributed in a substantially uniform manner along the drying path instead of being concentrated in a few overly taut areas of the belt located in a casual manner as took place with the known art.

In addition, said stretching effect is more concentrated toward the outlet of the installation where greater pressure is required because as the drying proceeds, and in particular below 30% humidity, the molecular structures of the wood undergo the greater modifications.

The progressive tension of the belts eliminates zones of relaxation and thus prevents the conveyed sheets from overlapping each other especially in the sloping sections of the path.

It is now clear that the present purposes of supplying a drying plant with more uniform and controlled behaviour of the tensions of the belts therein have been achieved, also securing considerable simplification of construction no longer requiring transmission of motion between all the rollers of the path.

By way of example, in the annexed FIGURE is shown a possible arrangement of the powered rollers to obtain the necessary adherence for entraining of the belts by means of a serpentine or S path of each belt around two powered rollers, both outside the path of mutual contact of the belts.

Naturally the above description of an embodiment applying the innovative principles of the present invention is given merely by way of example and therefore is not to be taken as a limitation of the patent right claimed here. For example, as already mentioned, the belt path inside the dryer can be different from that shown in the FIGURE and comprise for example several rollers for each loop of the belts so as to obtain more ample curves.

I claim:

1. Drying plant for wood veneer panels comprising:
   a drying chamber;
   two conveyor belts overlying and substantially mutually in contact with each other along a sinuous path between guide rollers inside said drying chamber for conveyance of the wood panels between said belts from an input end to an output end of said chamber; and
   drive means connected for driving at least one powered running roller,
   wherein each of the two belts winds around at least one said powered running roller positioned away from the path in which said belts contact each other, and
   wherein the guide rollers inside the sinuous path in contact with said conveyor belts overlying each other comprise idling rollers.

2. Plant in accordance with claim 1 characterized in that the powered rollers are transmission rollers at one end of the sinuous path in mutual contact with the belts.

3. Plant in accordance with claim 2 characterized in that said path end is near the output end of the chamber.

4. Plant in accordance with claim 2 characterized in that at the opposite end of the sinuous path are present idling transmission rollers for pretensioning of the belts.

5. Plant in accordance with claim 1 characterized in that the powered running rollers are two for each belt arranged sequentially to define an S path for the belts thereon.

* * * * *